United States Patent [19]
Crocker et al.

[11] 3,757,580
[45] Sept. 11, 1973

[54] DEVICE FOR MEASURING STRAIN IN ROTATING BODIES

[75] Inventors: Charles W. Crocker, Houston; Charles E. Barton, Kemah, both of Tex.

[73] Assignee: Esso Production Research Company, Houston, Tex.

[22] Filed: July 6, 1970
(Under Rule 47)

[21] Appl. No.: 52,207

[52] U.S. Cl. .............................. 73/136 A, 73/88.5 R
[51] Int. Cl. ............................................... G01l 3/10
[58] Field of Search .................... 73/136 A, 88.5 R, 73/351, 88.55 D; 340/195, 207; 331/111

[56] References Cited
UNITED STATES PATENTS

| | | | |
|---|---|---|---|
| 3,268,880 | 8/1966 | Miller | 340/207 |
| 3,530,449 | 9/1970 | Anderson | 340/177 |
| 3,350,944 | 11/1967 | De Michele | 73/398 |
| 3,336,795 | 8/1967 | Arakawa | 73/136 A |
| 3,062,043 | 11/1962 | Marsh | 73/88.5 |
| 3,350,574 | 10/1967 | James | 307/88.5 |
| 3,310,736 | 3/1967 | Bayly | 324/62 |
| 3,174,341 | 3/1965 | Sudo | 73/351 |
| 3,000,208 | 9/1961 | Piazza, Jr. | 73/136 A |
| 3,134,279 | 5/1964 | Sims et al. | 73/136 A X |
| 3,214,708 | 10/1965 | Chamberlain | 331/111 X |
| 3,380,000 | 4/1968 | Morrison | 331/111 X |
| 3,539,825 | 11/1970 | Hardaway | 307/271 X |
| 2,531,228 | 11/1950 | MacGeorge | 73/136 A |

OTHER PUBLICATIONS

MCRT Rotary Transformers, S. Himmelstein, 1968, 2500 Estes Ave., Elk Grove Village, Ill., 60007.

Primary Examiner—Charles A. Ruehl
Attorney—James A. Reilly, John B. Davidson, Lewis H. Eatherton, James E. Gilchrist, Robert L. Graham and James E. Reed

[57] ABSTRACT

A device for measuring strain in a rotating body comprising a resistance strain gauge, a voltage-to-frequency converter, a pulse transformer, and a frequency meter. The resistance strain gauge bonded to the rotating body produces a direct current output signal having a voltage amplitude linearly proportional to the strain in the body. The voltage-to-frequency converter translates the strain gauge output signal into a pulsating signal, the frequency of which is proportional to the strain gauge output signal. The pulse transformer transmits the pulsating signal to a stationary meter which can be calibrated in useful engineering units such as strain, stress, force, or torque.

10 Claims, 4 Drawing Figures

Patented Sept. 11, 1973

INVENTORS
CHARLES E. BARTON
CHARLES W. CROCKER
BY
Robert L. Graham

INVENTORS
CHARLES E. BARTON
CHARLES W. CROCKER
BY Robert L. Graham
ATTORNEY

DEVICE FOR MEASURING STRAIN IN ROTATING BODIES

BACKGROUND OF THE INVENTION

1. Field of the Invention

This invention relates to a device for measuring the strain in a rotating body. In one aspect it relates to a torque gauge as applied in rotary drilling operations.

2. Description of the Prior Art

A variety of mechanical, optical, and electrical instruments have been developed for indicating the strain or stress in a rotating body. Because of its simplicity, low cost, and versatility, the bonded resistance strain guage has received the widest application in this regard. Basically, this instrument comprises a resistance element bonded to the body under investigation and an electrical circuit for measuring the resistance changes in the element. Since the resistance change is proportional to the applied strain, the circuit output signal provides a measurement of physical variables of the body under investigation. The instrumentation for indicating the output signal in the circuit can be calibrated in accordance with the information desired such as strain, stress, torque, pressure, force, etc. However, the fundamental quantity measured in all of these applications is strain with the other data being derivatives thereof.

In applying the strain gauge principle to rotating bodies such as crank shafts, gas turbines, discs, fly wheels, and the like, the electrical circuit must include means for transmitting the output signal from the rotating body to a stationary meter. Slip ring and brush assemblies have been conventionally used for this purpose. However, these devices frequently produce inaccurate results because of variations in resistance across the brush contact on the slip ring.

Rotary transformers have also been used in connection with carrier wave systems to transmit the gauge output signal to a stationary meter. In these systems the amplitude of the oscillating output signal is modulated by the resistance change in the strain gauge element. The transmission of the amplitude modulated signal requires a transformer of extremely high electric performance and a highly sensitive meter for receiving the signals and translating them into useful information. Moreover the amplitude modulated systems are highly sensitive to electrical interference and are therefore impractical for certain field applications.

SUMMARY OF THE INVENTION

The purpose of the present invention is to provide an instrument for measuring strain in a rotating body without the necessity of using slip ring assemblies or amplitude modulated systems. The instrument includes a strain gauge bonded to the rotating body and adapted to produce a direct current output signal having a voltage proportional to the strain in the body; a voltage-to-frequency converter mounted on the rotating body and connected in circuit to receive the strain gauge output signal; and a pulse transformer for transmitting the converted output signal to a stationary frequency meter. Thus the frequency of the signal transmitted from the rotating body to the stationary meter is a function of the strain in the body under investigation. This arrangement permits the signal to be transmitted by means of a conventional pulse transformer thus eliminating the necessity of slip ring assemblies. Moreover this system has the added advantage of being relatively insensitive to external electrical interferences of the type generally associated with amplitude modulated systems.

The strain gauge can be composed of conventional resistance foils wired in a Wheatstone bridge circuit. However, the semiconductor strain gauge composed of silicon is preferred because of its high output signal and because it lends itself to convenient installation on the body under investigation.

The strain gauge and associated instrumentation contemplated by this invention finds particularly advantageous application in rotary drilling operations. This type of operation generally employs a drill string provided with a bit for boring holes in the earth. Force is transmitted to the drill string by means of a surface connection known as a rotary table. The rotary table is driven by a gear assembly comprising a ring gear and a pinion shaft which is connected to a prime mover by either a chain drive or a direct drive assembly. During drilling operations knowledge of the torque transmitted to the drill string through the pinion shaft provides a measure of downhole operating conditions. For example, when the bit becomes worn the torque required to rotate the drill string increases. During special drilling operations such as coring, milling, underreaming, etc., control of the torque in the drill string is particularly important in order to avoid excessive stresses which could cause the drill string to fail.

In accordance with the present invention, the strain gauge and associated instrumentation are mounted on the pinion shaft and electromagnetic means are used to transmit the intelligence from the rotating shaft to a stationary meter. The meter can be calibrated to indicate the desired information such as force, pressure, stress, strain, or torque. In present drilling operations, torque appears to represent the most useful information.

DESCRIPTION OF THE PREFERRED EMBODIMENTS

The strain gauge installation according to the present invention will be described in connection with a preferred application in rotary drilling operations. However, it should be observed that the invention is equally applicable for measuring strain in other operations and other types of rotating bodies.

Figure 1:
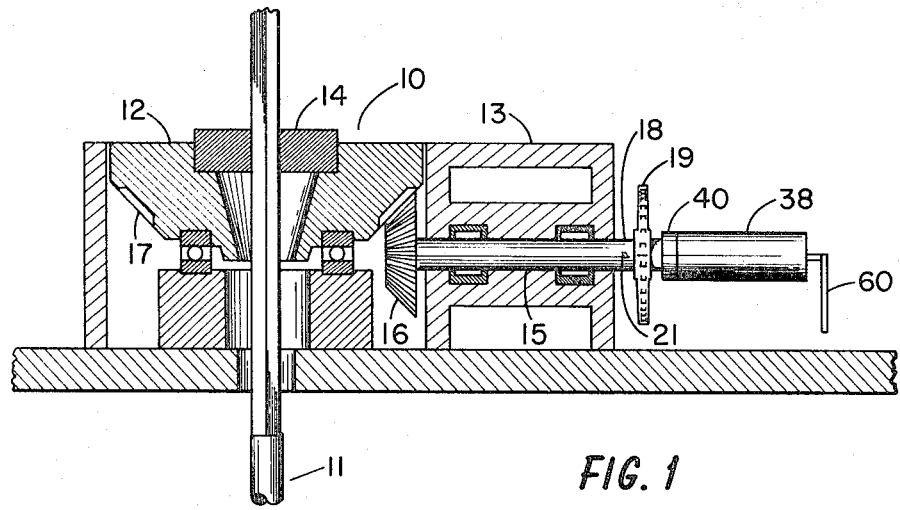
FIG. 1 is a vertical, sectional view of a rotary table shown connected in driving relation with a drill string.

With reference to FIG. 1, a rotary table assembly 10 is shown drivingly coupled to a drill string 11 of the type used in rotary drilling operations. In this type of operation, a bit (not shown) connected to the bottom of the drill string 11 is adapted to abrasively bore a hole in the earth as the string 11 is rotated.

The rotary table assembly 10 includes a rotary table 12 journaled to a support housing 13, a bushing 14 mounted on the table 12 and a drive shaft 15 journaled to the housing 13. The bushing 14 mates with the top joint (Kelly joint) of the drill string 11 and provides a sliding-fit drive therefor. A pinion 16 mounted on the shaft 15 meshes with a ring gear 17 secured to the outer periphery of the rotary table 12. An end portion 18 of the shaft 15 projects outwardly beyond the housing 13 and can be provided with a sprocket 19 for connection to a chain drive assembly (not shown). The rotary table assembly 10 described above is conventional serving to transmit torque from a prime mover (not shown) to the drill string 11.

Knowledge of the torque delivered to the drill string 11 can be highly useful information since it provides an indication of bit and hole conditions. The present invention provides an instrument capable of measuring the absolute torque in the drive shaft 15 which represents the torque delivered to the drill string 11.

As shown in the wiring diagram (FIG. 2), the instrument components include a strain gauge 21, a voltage-to-frequency converter 22, a pulse transformer 23, a frequency meter 24, and a direct current power supply 25. The strain gauge 21 is bonded to the drive shaft 15 between the sprocket 19 and the pinion 16, and the converter 22 is secured for corotation with the shaft 15 by a suitable carrier described in detail below. The meter 24 is positioned at a convenient readout location. As in conventional strain gauge applications, the direct current output signal of the strain gauge 21 has a voltage proportional to the torsional strain in the shaft 15. The present invention employs the voltage-to-frequency converter 22 to convert the strain gauge output signal into a pulsating signal having a frequency proportional to the voltage of the output signal. The pulsating signal then can be transmitted from the rotating shaft 15 to the stationary meter 24 by a pulse transformer 23 which can be constructed by techniques known in the art to provide an outer rotor 42 and an inner stator 51, the windings of each being secured to their respective supports by a suitable adhesive. This arrangement avoids the necessity of using slip ring assemblies and is not highly sensitive to noise and interference.

The electrical circuitry will be described with reference to FIG. 2 and the means for assembling the components in the rotary drilling application will be described with reference to FIG. 3.

Figure 2:
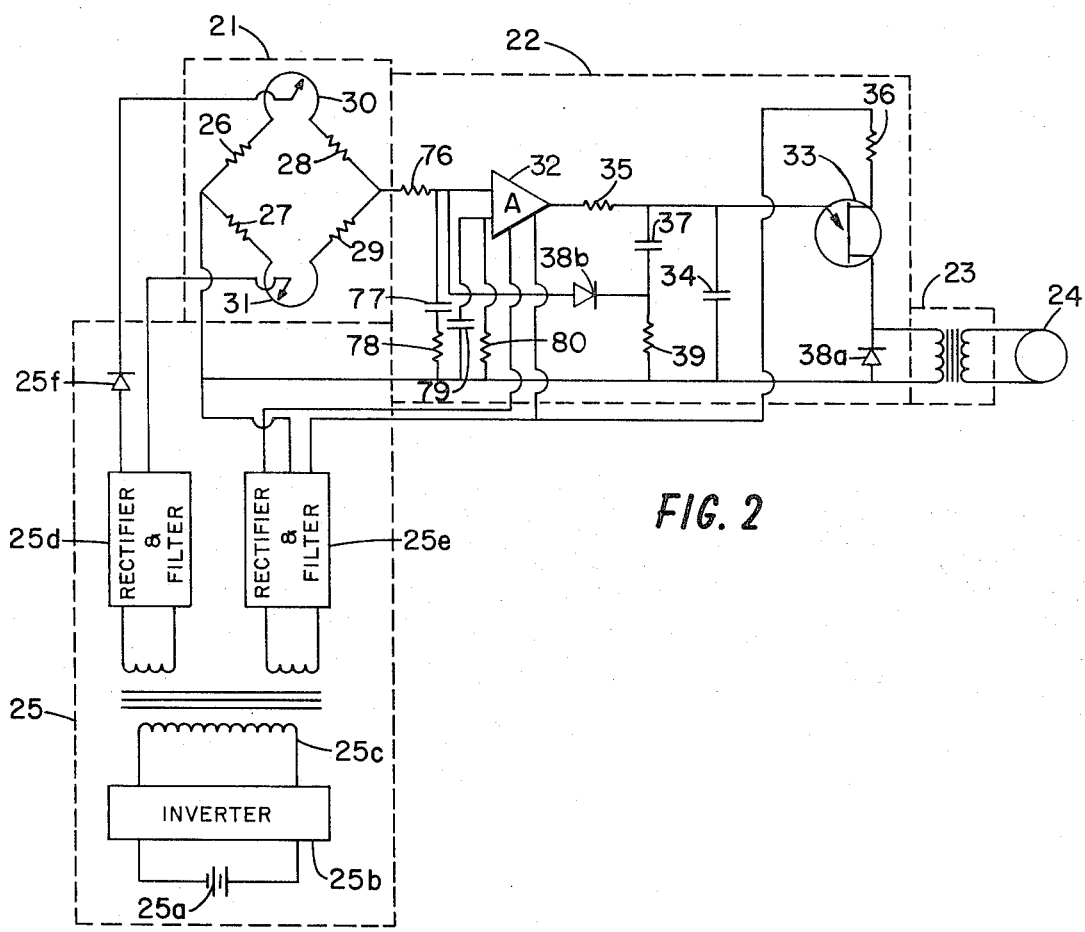
FIG. 2 is a simplified wiring diagram of the strain gauge and associated instrumentation contemplated by the present invention.

As shown in FIG. 2, the strain gauge 21 comprises resistors 26, 27, 28, and 29 wired in a Wheatstone bridge circuit. Variable resistors 30 and 31 provide means for balancing the bridge. A regulated direct current power source is connected across the bridge and can be provided by a battery or circuitry for connecting the bridge to an external power source. The power source circuitry can comprise an external regulated direct current power source 25a, an inverter 25b for converting the direct current signal into an alternating current, a power transformer 25c for transmitting power to the rotating body, and rectifier and filter circuits 25d and 25e. One of the rectifier and filter circuits 25d delivers a constant direct current supply to the strain gauge 21 and includes a current regulator 25f. The other circuit 25e provides direct current power for the converter 22. These components are represented collectively by block 25 in FIG. 2.

The resistors 26 – 29 can be foils, wires or semiconductors composed of materials having a resistance characteristic which varies proportionally with strain. However, the semiconductor strain gauge is preferred because of its high output voltage and because its small size facilitates installation. Type SB-3-350-300-4 strain gauge manufactured by Kulite Semiconductor Products, Inc. is one example of a semiconductor strain gauge usable in this system. The strain gauge 21 is bonded to the shaft 15 with the resistors 26 – 29 disposed at an angle of 45° in relation to the shaft axis for measuring torsional strain. A thermosetting resin such as epoxy can be used to bond the strain gauge to the shaft 15.

The strain gauge 21 is connected in circuit with the voltage-to-frequency converter 22. In this embodiment, the converter 22 comprises an operational amplifier 32 and a relaxation oscillator circuit. The amplifier 32 can be conventional having an input offset voltage of 2 mv Max and an amplification factor of about 160,000. Model RM4131 manufactured by Raytheon Company is one example of an amplifier usable in this system. The amplifier 32 has associated therewith an input network comprising input resistors 76 and 80, equalizing capacitor and resistor 77 and 78, and a bypass capacitor 79.

The relaxation oscillator circuit includes a unijunction transistor 33, an emitter capacitor 34, and resistors 35 and 36. The unijunction transistor 33 has a negative resistance region on the emitter characteristic curve which permits it to discharge a pulsating signal having a frequency proportional to the input voltage. The characteristics of parts 33, 34, and 35 are selected so that the load line intersects the emitter characteristic in the negative resistance region. Type 2N2647 is one example of a unijunction transistor usable in this system.

Figure 4:
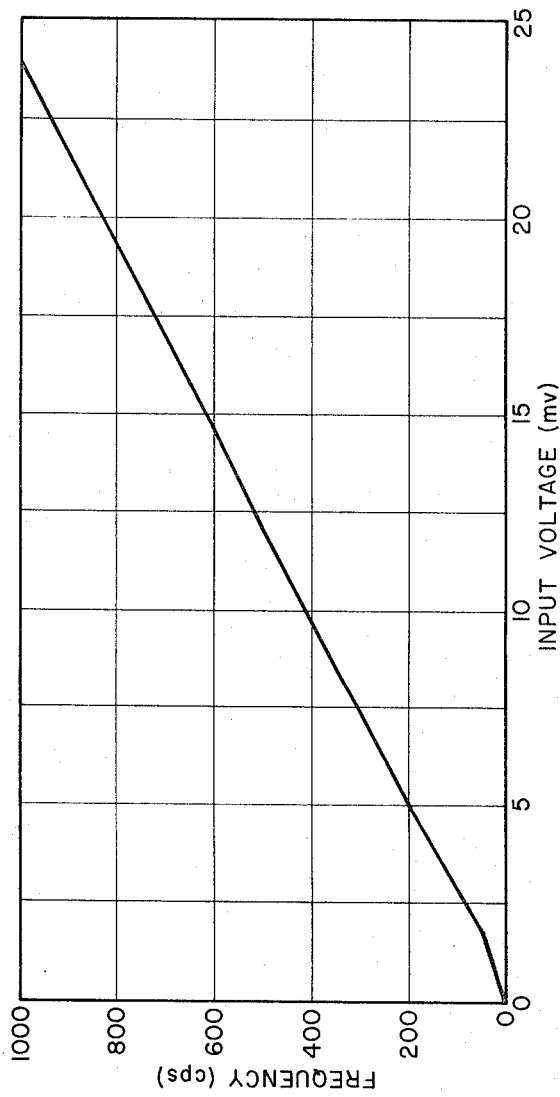
FIG. 4 is a characteristic curve of the voltage-to-frequency converter illustrating the linearity of the frequency output signal to the voltage of the input signal.

Diode 38a connected across the primary windings of the pulse transformer 23, and a negative feedback circuit comprising a capacitor 37, a diode 38b, and resistor 39 maintain a high degree of linearity between the frequency of the converter output signal and the voltage of the input signal. As shown in FIG. 2, the feedback circuit interconnects the relaxation oscillator circuit and the input of the amplifier 32. The graph of FIG. 4 is a calibration curve of a device constructed according to the present invention and illustrates the high degree of linearity between output frequency and input voltage.

The output pulses from the converter 22 can be transmitted to the stationary meter 24 by electromagnetic means such as a pulse transformer 23. The meter 24 which can be an oscilloscope or galvanometer receives the pulsating signal and translates it into useful information such as torque.

Figure 3:
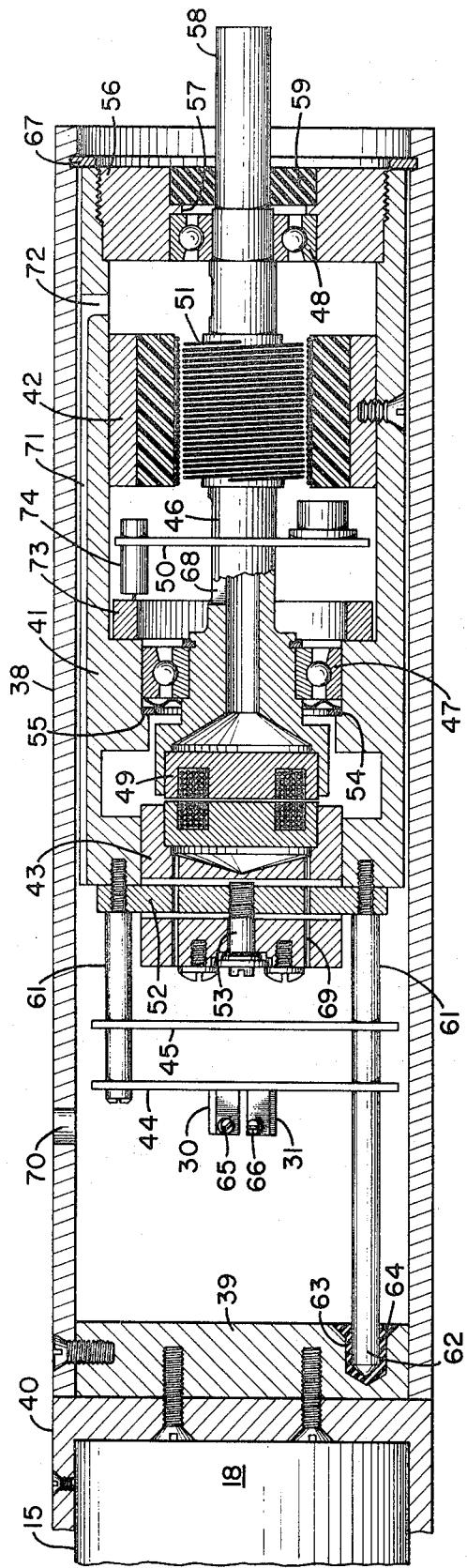
FIG. 3 is an enlarged fragmentary view, shown partially in section, of one preferred application of the present invention.

FIGS. 1 and 3 illustrate a preferred application of the present invention in rotary drilling operations. The strain gauge 21 is bonded to exposed end portion 18 of shaft 15.

A case 38 secured to the exposed end 18 of pinion shaft 15 houses the electrical components 22, 23, and portions of the power source 25 shown in FIG. 2. A plate 39 closes one end of the case 38 and is fastened to an adapter 40. The adapter 40 is clamped or otherwise affixed to the pinion shaft 15, coupling the case 38 and the shaft 15 together for corotation.

A cylindrical body 41 slidingly fits into the interior of the case 38 and is secured for corotation therewith. The body 41 carries the rotating components, e.g. a rotor 42 of the pulse transformer 23, the rotor 43 of the power transformer 25c, a printed circuit board 44 containing the voltage-to-frequency converter 22, and a printed circuit board 45 containing the rectifier and filter circuits 25d and 25e.

The stationary components are supported on a stationary member, e.g. hollow shaft 46 journaled to the body 41 by bearings 47 and 48. These components include a stator 49 for the power transformer 25c, a printed circuit board 50 containing an inverter 25b, and a stator 51 for the pulse transformer 23.

The rotor 43 provided with donut shaped windings slidingly fits into one end of the body 41 and is secured to a bar 52 by an adjustment screw 53. The bar 52 is secured to the body 41 and the head end of screw 53 is constrained so that rotation of the screw 53 causes the rotor 43 to move axially within the confines of body 41. The stator 49 is also provided with donut shaped windings. The stators 49 and 51 are arranged on the shaft 46 so that their windings respectively align with the windings of rotors 43 and 42 when the shaft is properly positioned within the body 41. The primary and secondary windings of the power transformer 25c are separated by an axial gap which can be adjusted by means of the adjustment screw 53. As shown in FIG. 2, the power supply 25 provides separate direct current power to the strain gauge 21 and the converter 22. To achieve this, the rotor 43 can be provided with separate windings each of which can be connected to respective rectifier and filter circuits as illustrated.

The stators 49, 51, inverter board 50, and bearings 47 and 48 mounted on the shaft 46 can be inserted into the body 41 as a unit. With this assembly position, the rotor 42 is inserted and secured to the body 41. Bearing 47 provided with a leafspring 54 abuts a shoulder 55 formed in the body 41 and thus properly locates the shaft assembly in relation to the body assembly. An annular closure member 56 is threadedly connected to the body 41 and provides means for maintaining the body and shaft assemblies together. The shaft 46 extends outwardly through an opening 57 formed in member 56 terminating in an exposed knurled end 58. A packing gland 59 provides a seal between the shaft 46 and member 56. The knurled end 58 carries a stabilizer bar 60 (see FIG. 1) which aids in maintaining the shaft assembly stationary in relation to the body assembly.

The circuit boards 44 and 45 are secured to the body 41 by means of a plurality of bolt and spacer assemblies shown generally as 61. One of the spacer assemblies 61 projects beyond the outer board 44 and is provided with a pointed end 62. End 62 is received in a recess 63 formed in the closure plate 39. The recess 63 can be provided with a plug 64 composed of resilient material such as rubber.

The variable resistors 30 and 31 are mounted on the board 44 and are provided with adjustment screws 65 and 66 for balancing the bridge.

The body 41 and 46 and associated parts can be inserted as a unit into the case 38 with the pointed end 62 being received in the recess 63. A slight amount of force depresses the resilient plug 64 permitting the insertion of a snap ring 67 into a suitable groove in case 38. The plug 64 imparts a slight biasing force on body 41 forcing it against the snap ring 67. This secures the body 41 in the case 38.

The wiring for connecting the various components in circuit can be as follows. From an external direct current power source 25a, lead wires pass axially through the shaft 46, through opening 68 and are connected to the inverter circuit 25b on board 50. From the inverter board 50 lead wires passing through opening 68 and the shaft 46 connect to the windings of stator 49. Lead wires from the separate windings in rotor 43 pass through holes 69 formed in the rotor 43 and are connected to separate rectifier and filter circuits 25d and 25e on board 45. From board 45 the lead wires connected to circuit 25d junction with the variable resistors 30 and 31 while lead wires from circuit 25e are connected to the converter 22 on board 44. The case 38 has an opening 70 formed therein to permit the adjustment of the variable resistors 30 and 31. The lead wires interconnecting resistors 30 and 31 and the strain gauge 21 pass through a suitable connector (not shown) and through a hole (not shown) in the sprocket 19. The output lead wires from the strain gauge 21 return to the interior of case 38 through the same connector and are connected to the voltage-to-frequency converter 22 on board 44. The lead wires from the board 44 pass through an axially extending slot 71 formed in the periphery of the body 41, through a radially extending hole 72 and are connected to the windings in rotor 42. Lead wires from the windings of stator 51 pass through the shaft 46, through end 58 and are connected to the meter 24 at a convenient readout location.

If desired, a tachometer can be installed in the device described above. A tachometer ring 73 composed of ferrous material is mounted internally of the body 41 and a magnetic transducer 74 for sensing the rotation of the ring 73 can be installed on the inverter board 50. Lead wires to and from the transducer 74 can pass through the shaft 46 and through the opening 68.

A particularly advantageous feature of this invention is that it can be adapted to existing equipment with very minor modifications. In the rotary drilling application as described above, the only modification required is an adapter 40 for coupling the case 38 to the shaft end 18 and the provision of a hole in the sprocket 19 to permit passage of the lead wires.

The readout meter 24 can be calibrated in units of torque by conventional dead weight techniques.

In operation, the torque transmitted through the pinion shaft 15 imparts a strain in the strain gauge 21. The output signal of the strain gauge 21 is transmitted to the voltage-to-frequency converter 22 as a variable direct current signal. The converter 22 transforms the direct current signal into a pulsating signal having a frequency proportional to the strain gauge signal. The pulsating signal is then transmitted to the stationary meter 24 via the pulse transformer 23. The meter 24 translates the pulsating signal into units of torque. The strain gauge 21 and instrumentation described provides torque measurements for clockwise or counterclockwise rotation of the pinion shaft 15.

While the present invention has been described in connection with rotary drilling operations, it again should be emphasized that the principle involved therein can be utilized in measuring strain in any rotating body.

We claim:

1. A device for measuring strain in a rotating shaft which comprises a strain gauge bonded to said shaft and being operative to produce a direct current output signal, the voltage amplitude of which is proportional to strain in said shaft; a direct current power source connected to the input of said strain gauge; a voltage-to-frequency converter corotatably mounted on said shaft, said voltage-to-frequency converter including a direct current amplifier for receiving and amplifying the direct current output signal of said strain gauge, a relaxation oscillator circuit connected to the output of said amplifier for converting the amplified direct current signal into a pulsating signal, the frequency of which is linearly proportional to the amplified direct current signal, and a negative feedback circuit interconnecting said relaxation oscillator circuit and the input of said amplifier; a pulse transformer for transmitting said pulsating signal from said shaft to a stationary readout point, said pulse transformer having a primary winding mounted on said shaft and being connected to said voltage-to-frequency converter and a stationary secondary winding; and a frequency meter connected to said secondary winding of said pulse transformer for measuring the frequency of said pulsating signal.

2. The invention as recited in claim 1 wherein said relaxation oscillator circuit includes transistor means.

3. The invention as recited in claim 1 wherein said transistor means is a unijunction transistor.

4. A device as defined in claim 1 wherein said direct current power source includes a rotary transformer having a stationary primary winding and a secondary winding mounted on said shaft; means for delivering an alternating current to said primary winding of said rotary transformer; and a rectifier circuit mounted on said shaft for converting said alternating current into a direct current, said rectifier circuit being connected to the input of said strain gauge.

5. A device as defined in claim 1 wherein said voltage-to-frequency converter produces a pulsating signal which is linearly proportional to the amplified direct current signal in an operating range between about 0 and about 1,000 cycles per second.

6. A device for measuring force delivered to a drilling string by a rotary table assembly having a housing, a drive shaft journaled to said housing, means for drivingly coupling said drive shaft to said drilling string, said device comprising: a strain gauge bonded to said drive shaft and adapted to produce a direct current output signal having a voltage proportional to the strain in said shaft; a voltage-to-frequency converter mounted for corotation with said shaft and connected to said said strain gauge for converting said direct current output signal into a pulsating signal, the frequency of which is proportional to the voltage of said strain gauge output signal, said voltage-to-frequency converter including an amplifier, a relaxation oscillator circuit connected to the output of said amplifier, and a feedback circuit from said relaxation oscillator circuit to the input of said amplifier; a pulse transformer having a primary winding mounted for corotation with said shaft and being connected to said voltage-to-frequency converter, and a stationary secondary winding; means for delivering a direct current power source to said strain gauge and to said voltage-to-frequency converter; and a frequency meter located at a stationary readout point and connected in circuit with said secondary winding of said pulse transformer.

7. The invention as recited in claim 6 wherein said strain gauge is a semiconductor strain gauge having a plurality of resistance elements connected in a Wheatstone bridge circuit, said elements being positioned on said drive shaft so that the output signal of said Wheatstone bridge circuit is a function of torsional strain in said drive shaft.

8. The invention as recited in claim 6 wherein said relaxation oscillator circuit includes a unijunction transistor.

9. A device for measuring the torque in a rotating shaft comprising a strain gauge bonded to said rotating shaft and being operative to deliver a direct current output signal, the voltage amplitude of which is indicative of the torsional strain in said rotating shaft; a case secured to one end of said rotating shaft; a body mounted in said case for corotation therewith; a voltage-to-frequency converter mounted on said body and being connected to the output of said strain gauge, said voltage-to-frequency converter including a relaxation oscillator circuit and heing operative to receive and convert the direct current output signal of said strain gauge into a pulsating signal having a frequency indicative of the voltage of said direct current output signal; a stationary shaft journally mounted in said body; a pulse transformer having a primary winding mounted on said body and a secondary winding mounted on said stationary shaft, said primary winding being connected to said voltage-to-frequency converter and being adapted to transmit said pulsating signal thereof to said secondary winding; and a stationary meter connected to said secondary winding for measuring the frequency of said pulsating signal.

10. A device for measuring the torque in a rotating shaft comprising a strain gauge bonded to said shaft and being operative to deliver a direct current output signal, the voltage amplitude of which is indicative of the torsional strain in said rotating shaft; a body secured to said rotating shaft for corotation therewith; a voltage-to-frequency converter mounted on said body and connected to the output of said strain gauge, said voltage-to-frequency converter including a direct current amplifier, a relaxation oscillator circuit and being operative to receive, amplify, and convert the direct current output signal of said strain gauge into a pulsating signal having a frequency proportional to the voltage of said direct current output signal; a stationary member journalled mounted to said body; a pulse transformer having a primary winding mounted on saidbody and a secondary winding mounted on said stationary member, said primary winding being connected to said voltage-to-frequency converter and being adapted to transmit said pulsating signal thereof to said secondary winding; and a stationary meter connected to said secondary winding for measuring the frequency of said pulsating signal.

* * * * *